UNITED STATES PATENT OFFICE.

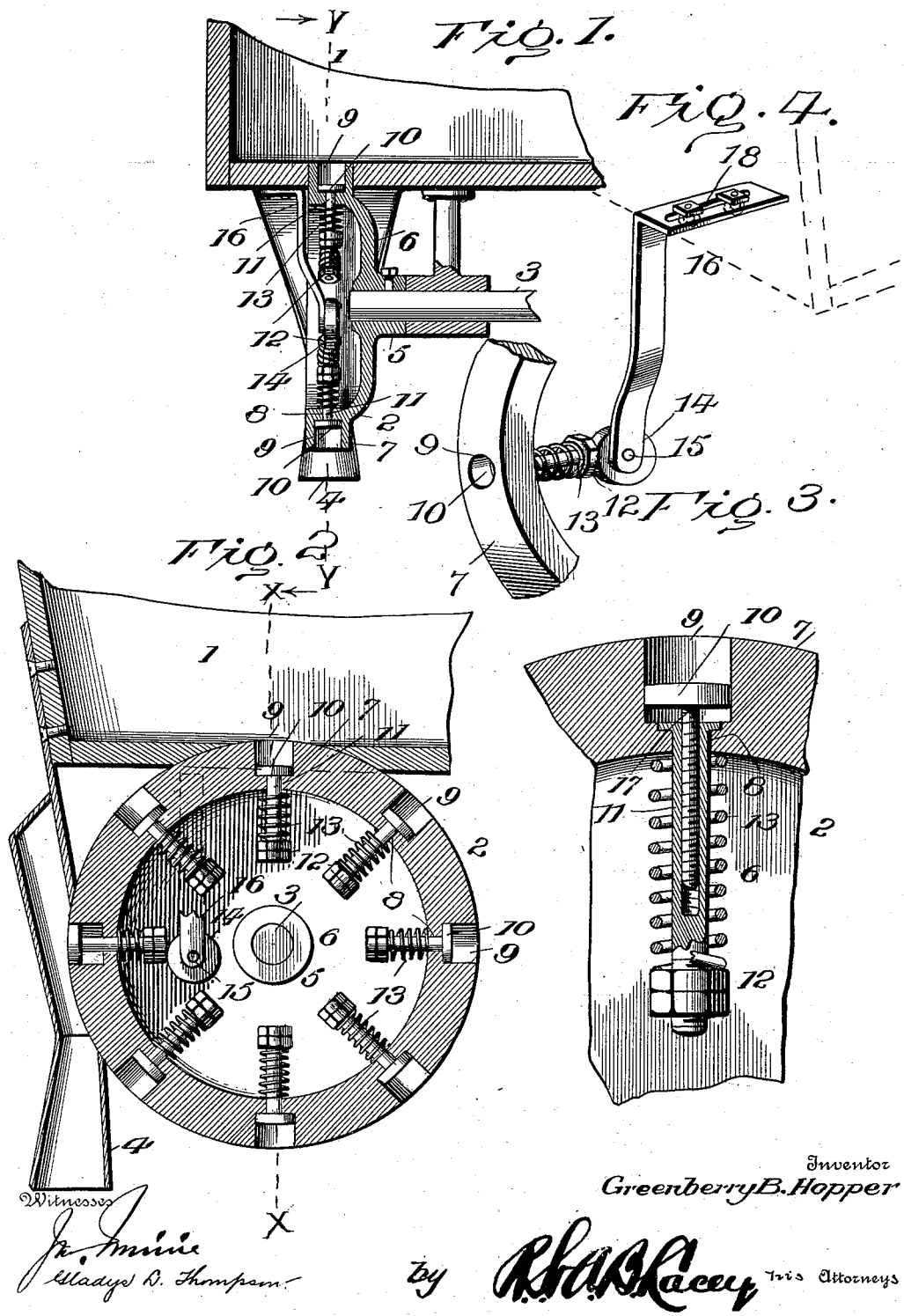

GREENBERRY B. HOPPER, OF SANTA MARIA, CALIFORNIA.

DROPPING MECHANISM FOR PLANTERS.

SPECIFICATION forming part of Letters Patent No. 637,612, dated November 21, 1899.

Application filed June 29, 1899. Serial No. 722,334. (No model.)

*To all whom it may concern:*

Be it known that I, GREENBERRY B. HOPPER, a citizen of the United States, residing at Santa Maria, in the county of Santa Barbara and State of California, have invented certain new and useful Improvements in Dropping Mechanism for Planters; and I do hereby declare the following to be a full, clear, and exact description of the invention, such as will enable others skilled in the art to which it appertains to make and use the same.

This invention relates to dropping mechanism for planters and fertilizer-distributers, and is designed to provide means of novel construction for delivering the seed or fertilizer in measured quantities, the parts being constructed to insure a positive delivery of the seed at the proper time.

For a full understanding of the merits, advantages, and details of construction of the invention reference is to be had to the following description and the drawings hereto attached.

Inasmuch as the invention is susceptible of general application in connection with planting and fertilizer-distributing mechanisms, it is to be understood that in adapting the same to any make or style of implement various changes in the form, proportion, and minor details of construction may be resorted to without departing from the spirit or sacrificing any advantages thereof.

Referring to the drawings forming a part of the specification, Figure 1 is a detail section on the line X X of Fig. 2 looking to the left, as indicated by the arrow, showing the invention in operative relation. Fig. 2 is a section on the line Y Y of Fig. 1 looking in the direction of the arrow. Fig. 3 is a sectional detail showing the manner of adjustably connecting the plungers to their spring-controlled stems. Fig. 4 is a detail view showing the manner of adjustably mounting the trip with reference to the plungers of the distributing-wheel.

Corresponding and like parts are referred to in the following description and indicated in all the views of the drawings by the same reference characters.

The hopper 1 may be of any form and is provided in its bottom with a slot or discharge-opening, through which the upper portion of the distributing-wheel 2 projects. The power-driven shaft 3, which carries one or more distributing-wheels, according to the capacity of the machine, is located at a suitable distance below the hopper and is operatively connected in any desired manner with a movable part of the machine. A spout or tube 4 is suitably disposed and mounted with reference to the distributing-wheel, so as to receive the seed therefrom and convey it to the furrow or trench in the usual manner. As shown, the spout or tube is located in the rear of the distributing-wheel. The latter discharges therein in a rearward and horizontal direction. Hence the necessity for positive expulsion of the seed from the pockets or cups of the wheel.

The distributing-wheel comprises a hub portion 5, web portion 6, of concavo or dish form, and a rim 7, projecting from the hollow or concave side of the wheel and formed with radial openings 8 and pockets or cups 9. A plunger 10 is provided for each pocket or cup and is slidable therein, its stem 11 passing freely through the opening 8 corresponding with the pocket. A nut 12 is mounted upon the inner threaded end of each stem 11, and a coil-spring 13, mounted upon each of the stems, is confined between the nut 12 and the inner side of the rim 7 and serves to hold the plunger within the pocket or cup and against the innermost or bottom wall thereof.

In order to prevent accidental movement of the nuts 12, corresponding jam-nuts are likewise applied to the threaded ends of the stems 11. By having the body or web portion 6 of the distributing-wheel of concavo-convex form ample clearance is had for the stems 11 of the plungers and the adjunctive parts thereof.

A trip is disposed to cooperate in succession with each of the plungers and move them outward, so as to effect a positive discharge of the seed. As shown, this trip consists of a roller 14, mounted upon a spindle 15, and a bracket 16, secured to the hopper or other convenient portion of the machine. The roller 14 is disposed in the path of the inner ends of the spring-controlled stems 11, so as to force them outward as they are brought successively into position opposite the trip.

When the machine is in operation, the shaft 3 is rotated and imparts a corresponding movement to the distributing-wheel secured thereto. As the distributing-wheel rotates, the pockets or cups are brought into position to receive a quantity of seed or fertilizer, which is carried to the spout or tube, and at this instant the spring-controlled stem is engaged by the trip and is actuated to move the plunger outward in the cup or pocket and dislodge the contents from the cup and insure its proper delivery into the tube which conveys it to the trench or furrow. As the spring-controlled stems clear the trip, the plungers are returned to a normal position by the reaction of the springs 13.

Fig. 3 shows a construction which admits of the plungers being adjusted with reference to their spring-controlled stems so as to vary the capacity of the pockets or cups by making them deep or shallow, as required. In this construction the spring-controlled stems are composed of sections adjustably connected, the outer section maintaining a fixed position with reference to the distributing-wheel and the inner section being adjustable and having the plunger attached directly thereto. The adjustable part 17 may be properly designated as the "shank" and is exteriorly threaded to coöperate with a threaded opening formed longitudinally in the stem 11. In order to make provision for the varied movement of the plungers when adjusted so as to project them beyond the outer surface of the rim 7, it has been found necessary to adjustably mount the trip, which may be perfected in a variety of ways, and, as shown, the base of the bracket-arm 16 is slotted, as shown at 18, to receive the bolt or fastening by means of which it is adjustably connected to the hopper or other convenient support.

Having thus described the invention, what is claimed as new is—

1. In distributing mechanism for planters, a distributing-wheel comprising a body or web portion dished or made hollow upon one side and having a rim projecting outwardly from the said hollow side and formed with radial openings and pockets, plungers movably mounted in the pockets and having stems loosely mounted in said openings and provided at their delivery ends with stops, springs located upon the projecting ends of the stems and confined between the stops thereof and the inner side of the rim, a trip located in the path of the inner ends of the spring-controlled stems and an adjustable support for the trip, as and for the purpose described.

2. In distributing mechanism for planters, a distributing-wheel provided with pockets, spring-controlled stems bearing a fixed relation to said pockets and adapted to be actuated by means of a trip, and plungers movably mounted in the pockets and having shanks adjustably connected with the said spring-controlled stems, substantially as set forth.

3. In distributing mechanism for planters, a distributing-wheel provided with pockets, plungers movably mounted in the pockets and having spring-controlled stems composed of relatively adjustable parts, one of said parts bearing a fixed relation to the distributing-wheel and the other attached directly to the plunger and adjustable with reference to the distributing-wheel, and a trip located in the path of the spring-controlled stems and adapted to be adjusted to allow for a variation of movement of the plungers by reason of their adjustment, substantially as set forth.

4. A distributing-wheel for planters, comprising a dished-shaped web portion having an offstanding rim at the hollow side, said rim being formed with radially-disposed openings and pockets, stems slidably mounted in said openings and formed with threaded bores and having stops at their inner ends, coil-springs mounted upon said stems and confined between the stops thereof and the inner side of the rim, and plungers movably mounted in the pockets and provided with threaded shanks to coöperate with the threaded bores of the spring-controlled stems, as and for the purpose set forth.

In testimony whereof I affix my signature in presence of two witnesses.

GREENBERRY B. HOPPER. [L. S.]

Witnesses:
  WALTER ELLIOT,
  WILLIAM W. STOW.